H. J. CARSON.
FEED REGULATOR.
APPLICATION FILED MAR. 19, 1919.
1,426,041.
Patented Aug. 15, 1922.
2 SHEETS—SHEET 1.
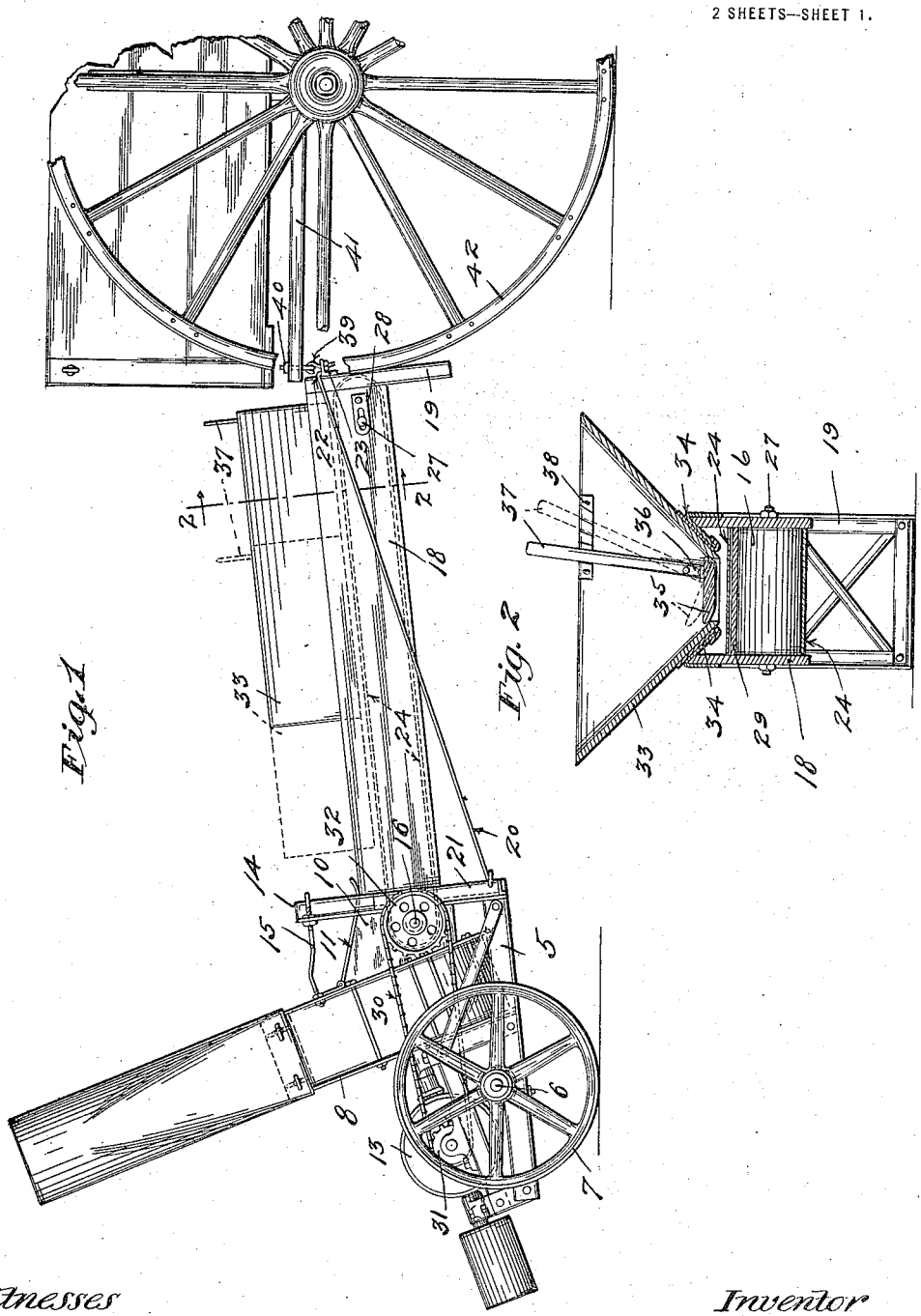
Witnesses
E. G. Wells
H. D. Kilgore
Inventor
Hugh J. Carson
By his Attorneys
Williamson & Merchant

H. J. CARSON.
FEED REGULATOR.
APPLICATION FILED MAR. 19, 1919.

1,426,041.

Patented Aug. 15, 1922.
2 SHEETS—SHEET 2.

Witnesses
E. C. Wells
H. D. Kilgore

Inventor
Hugh J. Carson
By his Attorneys
Williamson Merchant

UNITED STATES PATENT OFFICE.

HUGH J. CARSON, OF FAIRFAX, MINNESOTA.

FEED REGULATOR.

1,426,041.   Specification of Letters Patent.   Patented Aug. 15, 1922.

Original application filed July 27, 1916, Serial No. 111,636. Patent No. 1,294,397, dated February 18, 1919. Divided and this application filed March 19, 1919. Serial No. 283,601.

*To all whom it may concern:*

Be it known that I, HUGH J. CARSON, a citizen of the United States, residing at Fairfax, in the county of Renville and State of Minnesota, have invented certain new and useful Improvements in Feed Regulators; and I do hereby declare the following to be a full, clear, and exact description of the invention, such as will enable others skilled in the art to which it appertains to make and use the same.

My invention relates to improvements in portable elevators and is in the nature of a division of my co-pending application of the same title, filed July 27, 1916, under S. N. 111,636, which matured into Patent #1,294,397 granted February 18, 1919.

To the above end, the invention consists of the novel devices and combinations of devices hereinafter described and defined in the claims.

In the accompanying drawings, which illustrate the invention, like characters indicate like parts throughout the several views.

Referring to the drawings,

Fig. 1 is a fragmentary view in side elevation showing the invention attached to a wagon by which it may be drawn from place to place;

Fig. 2 is a transverse section taken on the line 2—2 of Fig. 1;

Figure 3:
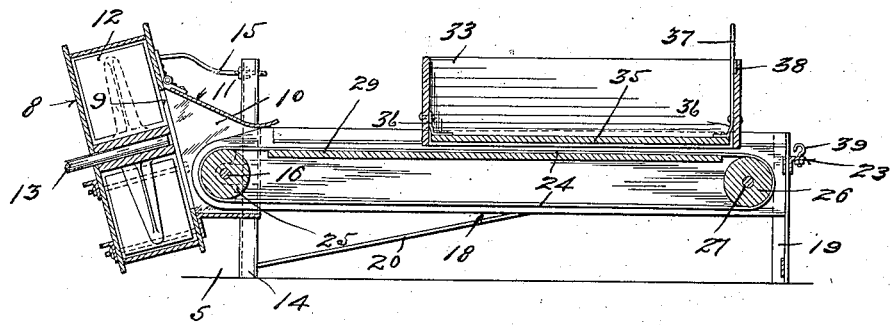
Fig. 3 is a longitudinal section taken centrally through the elevator with the wheels removed and supported in operative position on the ground.
Figure 4:
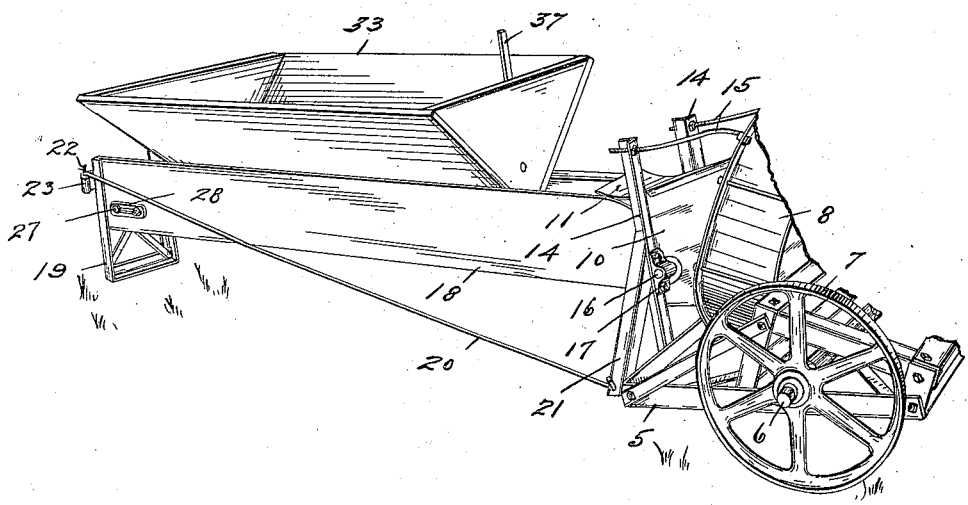
Fig. 4 is a perspective view of the loader, as shown in Fig. 1.

The numeral 5 indicates a main frame or base having an axle 6 on which is removably journaled a pair of truck wheels 7. These truck wheels 7 are provided for transporting the elevator from place to place, as shown in Fig. 1, but when the elevator is in use, said wheels are removed and the base 5 supported directly on the ground, as shown in Fig. 3.

A fan casing 8 is mounted on the frame 5 in an oblique position and has on its uppermost side an eye 9. Surrounding the eye 9, is a casing extension 10 having a hinged cover or top plate 11. Mounted in the fan casing 8, is a centrifugal fan 12 having a shaft and driving connections, indicated as an entirety by the numeral 13. A gas engine or other suitable means may be provided for driving the fan 12.

Located on the eye side of the fan casing 8, is a pair of posts 14, the lower ends of which are pivoted to the frame 5 and their upper ends are adjustably connected by a pair of rods 15 to said fan casing. A horizontal shaft 16, which extends transversely of the loader, is journaled in bearings 17 on the intermediate portions of the posts 14.

One end of a conveyor frame 18 is extended into the fan casing extension 10 and pivoted on the shaft 16 for vertical swinging movement. The other or outer end of the conveyor frame 18 is open and provided with a leg structure 19. A pair of oblique rods 20 is provided for holding the conveyor frame 18 against pivotal movement on the shaft 16. The inner ends of these rods 20 are removably attached to the lower ends of a pair of braces 21 for the posts 14 and their other or outer ends are bent to form hooks 22 adapted to enter eyes in a transverse bar 23 on the upper end portions of the leg structure 19.

Within the frame 18, is an endless conveyor 24, in the form of a wide belt arranged to run over a pair of rollers 25 and 26, the former of which is driven by securing the same to the shaft 16 for rotation therewith and the latter of which is idle and carried by a shaft 27 mounted in adjustable bearings 28 on the frame 18. Obviously, by adjusting the bearings 28, the tension of the conveyor 24 may be varied, at will. The upper section of the conveyor 24 is supported on a deck 29 within the frame 18.

The endless conveyor 24 is driven by a sprocket chain 30 arranged to run over a sprocket wheel 31, secured to one of the movable parts of the connections 13 and a relatively large sprocket wheel 32 on the shaft 16. As the sprocket wheel 32 is located at the pivot support for the frame 18, the tension of the sprocket chain 30 is not changed, during the raising and lowering of said frame, but it may be varied, at will, by adjusting the posts 14 with the rods 15. It will be noted that the cover 11 rests on the conveyor frame 18 and moves therewith, during the swinging movement of said frame.

An open bottom hopper trough 33 is mounted on the upper longitudinal edges of the conveyor frame 18, for horizontal sliding movement toward and from the eye of the fan casing 8. Interlocking joint strips 34 connect the hopper trough 33 to the conveyor frame 18, with freedom for horizontal sliding movement, but hold the same against lifting movement therefrom. If desired, the hopper trough 33 may be entirely moved from the conveyor frame 18 by sliding the same through the outer open end thereof. The open bottom of the hopper trough 33 is arranged to discharge grain onto the upper section of the conveyor 24 and the flow of grain thereto is regulated by a feed board 35.

The feed board 35 is suspended within the hopper 33 by a pair of upright arms 36 having their lower ends forming brackets and rigidly secured to the upper face of said feed board and having their upper ends pivoted to the ends of the hopper trough 33. The outer arm 36 is extended to form an operating lever 37 by which the feed board 35 may be oscillated within the feed hopper 33 to either completely close the open bottom thereof, or variably open the same at the longitudinal edges of said board to permit the escape of grain from the hopper trough 33 to the conveyor 24. To hold the feed board 35 in different adjustments, there is secured to the front end of the hopper trough 33 a notched latch bar 38 with which the lever 37 yieldingly interlocks by a lateral springing action.

A hook 39, secured to the bar 23 at the transverse center of the elevator, is adapted to be interlocked with an eye-bolt 40 secured in the reach 41 of a wagon 42. This hook 39 and eye-bolt 40 afford a separable coupling for connecting the elevator to a wagon as a trailer and supporting the front leg structure 19 above the road, so that said elevator is supported entirely on its wheels 7. When the elevator is attached to a wagon as a trailer, the rods 20 are used to hold the conveyor frame 18 against pivotal movement with respect to the frame 5.

In using the elevator for conveying grain from a wagon and discharging the same into a storage bin or other receptacle, the same must be detached from the wagon, the wheels 7 removed, to permit the frame 5 to rest directly on the ground, and the rods 20 detached to release the conveyor frame 18, so that the same may be swung on its pivot 16.

The elevator frame 18 is then raised to permit a wagon, hauling grain to the elevator, to pass the same and then lowered and the hopper trough 33 adjusted, transversely of the wagon, to bring the same into alignment with the box. The tail gate of the wagon is then opened to permit the discharge of grain into the hopper trough 33. From the hopper trough 33, the grain is fed to the conveyor 24, in any desired quantities, by adjusting the feed board 35 to vary the openings between said feed board and the sides of the hopper trough. The conveyor 24 delivers the grain through the eye 9 to the fan 12, which, in turn, discharges the same into the bin or other receptacle.

What I claim is:—

1. A feeding device comprising a hopper having parallel end walls and converging side walls spaced at their bottom edges, a flat member extending substantially horizontally between said edges and overlapping one of the same, said member being pivoted to the end walls of the hopper on an axis located above said member and at one side of the center thereof.

2. The structure set forth in claim 1, said member having its bottom portion upwardly curved at the side where it overlaps one of the said edges of the hopper side.

3. A feeding device comprising a hopper having parallel end walls and converging side walls spaced at their bottom edges, a flat member extending between said edges and overlapping one of the same, said member being pivoted to the end walls of the hopper on an axis located above said member and on one side of the center thereof, said member also having brackets secured to its upper surface by which it is pivoted to said end walls, a handle projecting upwardly at one end of the same for swinging said member on its pivot and means for holding said handle in various positions of adjustment.

In testimony whereof I affix my signature in presence of two witnesses.

HUGH J. CARSON.

Witnesses:
 CLARA DEMAREST,
 HARRY D. KILGORE.